United States Patent
Eichenauer et al.

(10) Patent No.: US 6,767,964 B2
(45) Date of Patent: Jul. 27, 2004

(54) POLYMER COMPOSITIONS WITH AN IMPROVED CONSTANCY OF CHARACTERISTICS

(75) Inventors: Herbert Eichenauer, Dormagen (DE); Adolf Schmidt, Adelsheim (DE); Ulrich Jansen, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 180 days.

(21) Appl. No.: 10/204,147

(22) PCT Filed: Feb. 12, 2001

(86) PCT No.: PCT/EP01/01496
§ 371 (c)(1),
(2), (4) Date: Aug. 16, 2002

(87) PCT Pub. No.: WO01/62812
PCT Pub. Date: Aug. 30, 2001

(65) Prior Publication Data
US 2003/0027898 A1 Feb. 6, 2003

(30) Foreign Application Priority Data
Feb. 23, 2000 (DE) .......................................... 100 08 419

(51) Int. Cl.$^7$ .............................................. C08G 63/48
(52) U.S. Cl. ............................. 525/66; 525/67; 525/68; 525/69; 525/71
(58) Field of Search .............................. 525/66, 67, 68, 525/69, 71

(56) References Cited

U.S. PATENT DOCUMENTS 5,719,232 A    2/1998   Schmidt et al. ............... 525/86

FOREIGN PATENT DOCUMENTS

| | | |
|---|---|---|
| DE | 24 20 358 | 12/1975 |
| DE | 39 13 509 | 10/1990 |
| EP | 0 116 330 | 8/1984 |
| EP | 0 134 519 | 3/1985 |
| EP | 0 412 371 | 2/1991 |
| EP | 0 678 531 | 10/1995 |
| EP | 0 845 496 | 6/1998 |

*Primary Examiner*—Jeffrey Mullis
(74) *Attorney, Agent, or Firm*—Joseph C. Gil; Aron Preis

(57) ABSTRACT

A thermoplastic molding composition that features constancy of properties, especially toughness and processability is disclosed. The composition contains a first graft rubber polymer that is a product of emulsion polymerisation of styrene and acrylonitrile in the presence of a butadiene polymer latex (A) with a mean particle diameter $d_{50}$ of 80 to 220 nm, a second graft rubber polymer obtained by emulsion polymerisation of styrene and acrylonitrile in the presence of a butadiene polymer latex (B) with a mean particle diameter $d_{50}$ of 340 to 480 nm, and a rubber-free copolymer of styrene and acrylonitrile. Importantly, the butadiene polymer latex (A) is the product of seed polymerization using a seed latex with a mean particle diameter of 10 to 100 nm, and the butadiene polymer latex (B) is the product of seed polymerisation using the butadiene polymer latex (A) as seed latex.

8 Claims, No Drawings

POLYMER COMPOSITIONS WITH AN IMPROVED CONSTANCY OF CHARACTERISTICS

ABS moulding compositions or moulding compositions of the ABS type have already been used for many years in large amounts as thermoplastic resins for producing moulded parts of all types. In this connection the property spectrum of these resins can be varied within wide ranges.

Particularly important properties of ABS moulding compositions that may be mentioned include toughness (impact strength, notched impact strength), modulus of elasticity, processability (MVR), heat resistance, surface gloss, attention being paid in general to specific property combinations depending on the area of use.

A particularly important feature for the processing of ABS moulding compositions, particularly when using fully automated production plants, is the constancy of the properties or property combinations of the moulding compositions to be processed.

Although products with relatively narrow tolerance limits can be produced by using modern processes in the ABS production (for example computerised control of polymerisation and compounding) nevertheless for special applications it is necessary to have even more improved constant properties that can be achieved only via the product composition or the product structure.

The object therefore existed of producing thermoplastic moulding compositions of the ABS type having a very constant property profile.

The object according to the invention is achieved by using combinations of two graft rubber polymers, in the production of which are employed rubbers with defined particle diameters obtained by seed polymerisation using seed latex particles with defined particle diameters.

The present invention provides polymer compositions containing

I) at least one graft rubber polymer obtained by emulsion polymerisation of styrene and acrylonitrile in a weight ratio of 95:5 to 50:50, styrene and/or acrylonitrile being able to be partially or completely replaced by α-methylstyrene, methyl methacrylate or N-phenylmaleimide or mixtures thereof, in the presence of a butadiene polymer latex (A) with a mean particle diameter $d_{50}$ of 80 to 220 nm, preferably 90 to 210 nm, and particularly preferably 100 to 200 nm, II) at least one graft rubber polymer obtained by emulsion polymerisation of styrene and acrylonitrile in a weight ratio of 95:5 to 50:50, styrene and/or acrylonitrile being able to be completely or partially replaced by α-methylstyrene, methyl methacrylate or N-phenylmaleimide or mixtures thereof, in the presence of a butadiene polymer latex (B) with a mean particle diameter $d_{50}$ of 340 to 480 nm, preferably 350 to 470 nm, and particularly preferably 360 to 460 nm, III) at least one rubber-free copolymer of styrene and acrylonitrile in a weight ratio of 95:5 to 50:50, styrene and/or acrylonitrile being able to be completely or partially replaced by α-methylstyrene, methyl methacrylate or N-phenylmaleimide or mixtures thereof, characterised in that the butadiene polymer latex (A) was obtained by seed polymerisation using a seed latex with a mean particle diameter of 10 to 100 nm, preferably 20 to 90 nm, and particularly preferably 30 to 80 nm, and the butadiene polymer latex (B) was obtained by seed polymerisation using the butadiene polymer latex (A) as seed latex.

The present invention also provides a process for producing the polymer compositions according to the invention, wherein the butadiene polymer latex (A) is obtained by seed polymerisation using a seed latex with a mean particle diameter of 10 to 100 nm and the butadiene polymer latex (B) is obtained by seed polymerisation using the butadiene polymer latex (A) as seed latex.

In general the polymer compositions according to the invention may contain the graft rubber components (I)+(II) in amounts of 1 to 60 parts by weight, preferably 5 to 50 parts by weight, and the rubber-free resin component (III) in amounts of 40 to 99 parts by weight, preferably 50 to 95 parts by weight.

The weight ratio of (I):(II) may be varied within wide limits; it is conventionally 90:10 to 10:90, preferably 80:20 to 30:70, and particularly preferably 70:30 to 40:60.

Apart from the aforementioned polymer components the polymer compositions according to the invention may contain further rubber-free thermoplastic resins not built up from vinyl monomers, these thermoplastic resins being used in amounts of up to 1000 parts by weight, preferably up to 700 parts by weight and particularly preferably up to 500 parts by weight (in each case referred to 100 parts by weight of I+II+III).

The butadiene polymer latices (A) and (B) are produced by emulsion polymerisation of butadiene according to the so-called seed polymerisation technique, in which first of all a finely particulate polymer, preferably a butadiene polymer, is produced as seed latex and is then polymerised further by reaction with butadiene-containing monomers into larger particles (see for example in Houben-Wyl, Methoden der Organischen Chemie, Makromolekulare Stoffe, Part 1, p. 339 (1961), Thieme Verlag Stuttgart). In this connection the process is preferably carried out using a seed batch process or a continuous seed flow process.

As comonomers there may be used up to 50 wt. % (referred to the total amount of monomer used for the butadiene polymer production), of one or more monomers copolymerisable with butadiene.

Examples of such monomers include isoprene, chloroprene, acrylonitrile, styrene, α-methylstyrene, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates, divinyl benzene; preferably butadiene is used alone or mixed with up to 20 wt. %, preferably with up to 10 wt. %, of styrene and/or acrylonitrile.

As seed latex polymers there are preferably used butadiene polymers such as for example polybutadiene, butadiene/styrene copolymers, butadiene/acrylonitrile copolymers, or polymers obtained from the aforementioned monomers.

In principle there may also be used other finely particulate latex polymers, such as for example polystyrene or styrene copolymers, polymethyl methacrylate or methyl methacrylate copolymers, as well as polymers of other vinyl monomers.

Preferred seed latex polymers are polybutadiene latices.

In this connection a seed latex with a mean particle diameter $d_{50}$ of 10 to 100 nm, preferably 20 to 90 nm, and particularly preferably 30 to 80 nm, is used in the production of the butadiene polymer latex (A).

The butadiene polymer latex (A) is used as seed latex in the production of the butadiene polymer latex (B).

The seed latex for producing the butadiene polymer (A) has a gel content of 10 to 95 wt. %, preferably 20 to 90 wt. %, and particularly preferably 30 to 85 wt. %.

The butadiene polymer latex (A) has a mean particle diameter $d_{50}$ of 80 to 220 nm, preferably 90 to 210 nm, and particularly preferably 100 to 200 nm.

The gel content of (A) is 30 to 98 wt. %, preferably 40 to 95 wt. %, and particularly preferably 50 to 92 wt. %.

The butadiene polymer latex (B) has a mean particle diameter $d_{50}$ of 340 to 480 nm, preferably 350 to 470 nm, and particularly preferably 360 to 460 nm.

The gel content of (B) is 50 to 95 wt. %, preferably 55 to 90 wt. %, and particularly preferably 60 to 85 wt. %.

The mean particle diameter $d_{50}$ may be determined by ultracentrifuge measurements (see W. Scholtan, H. Lange: Kolloid Z. u. Z. Polymere 250, pp. 782 to 796 (1972)), the specified values for the gel content referring to the determination according to the wire cage method in toluene (see Houben-Weyl, Methoden der Organischen Chemie, Makromolekulare Stoffe, Part 1, p. 307 (1961), Thieme Verlag Stuttgart).

The gel contents of the butadiene polymer latices (A) and (B) as well as of the seed polymer latex for producing the butadiene polymer latex (A) may in principle be adjusted in a known manner by employing suitable reaction conditions (e.g. high reaction temperature and/or polymerisation up to a high conversion, as well as optionally the addition of crosslinking substances in order to achieve a high gel content, or for example low reaction temperature and/or termination of the polymerisation reaction before too high a degree of crosslinking has occurred, as well as optionally the addition of molecular weight regulators, such as for example n-dodecyl mercaptan or t-dodecyl mercaptan in order to achieve a low gel content). As emulsifiers there may be used conventional anionic emulsifiers such as alkyl sulfates, alkyl sulfonates, aralkyl sulfonates, soaps of saturated or unsaturated fatty acids, as well as alkaline disproportionated or hydrogenated abietinic acid or tall oil acids, and preferably emulsifiers are used containing carboxyl groups (for example salts of $C_{10}$–$C_{18}$ fatty acids, disproportionated abietinic acid, emulsifiers according to DE-OS 36 39 904 and DE-OS 39 13 509).

The production of the graft rubber polymers (I) and (II) may be carried out in an arbitrary manner by separate grafting of the butadiene polymer latices (A) and (B) in separate reactions or by joint grafting of a mixture of the butadiene polymer latices (A) and (B) during one reaction.

In this connection the graft polymerisation(s) may be carried out according to any suitable methods, and is preferably carried out in such a way that the monomer mixture is continuously added to the butadiene polymer latex (A) and/or to the butadiene polymer latex (B) and/or to a mixture of the butadiene polymer latices (A) and (B), and is polymerised.

Special monomer/rubber ratios are preferably maintained during the polymerisation, and the monomers are added to the rubber in a known manner:

In order to produce the components (I) and (II) according to the invention, preferably 15 to 50 parts by weight, particularly preferably 20 to 40 parts by weight, of a mixture of styrene and acrylonitrile that may optionally contain up to 50 parts by weight (referred to the total amount of the monomers employed in the graft polymerisation) of one or more comonomers, are polymerised in the presence of preferably 50 to 85 parts by weight, particularly preferably 60 to 80 parts by weight (in each case referred to solids) of the butadiene polymer latex (A) and/or of the butadiene polymer latex (B) and/or of a mixture of the butadiene polymer latices (A) and (B).

The monomers used in the graft polymerisation are preferably mixtures of styrene and acrylonitrile in a weight ratio of 95:5 to 50:50, particularly preferably in a weight ratio of 80:20 to 65:35, wherein styrene and/or acrylonitrile may be wholly or partially replaced by copolymerisable monomers, preferably by α-methylstyrene, methyl methacrylate or N-phenylmaleimide. In principle arbitrary further copolymerisable vinyl monomers may additionally be used in amounts of up to ca. 10 wt. % (referred to the total amount of the monomers).

In addition molecular weight regulators may be used in the graft polymerisation, preferably in amounts of 0.01 to 2 wt. %, particularly preferably in amounts of 0.05 to 1 wt. % (in each case referred to the total amount of monomers in the graft polymerisation stage).

Suitable molecular weight regulators are for example alkyl mercaptans such as n-dodecyl mercaptan, t-dodecyl mercaptan; dimeric α-methylstyrene; terpinolene.

Suitable initiators that may be used include inorganic and organic peroxide, for example $H_2O_2$, di-tert.-butyl peroxide, cumene hydroperoxide, dicyclohexyl percarbonate, tert.-butyl hydroperoxide, p-menthane hydroperoxide, azo initiators such as azobisisobutyronitrile, inorganic persalts such as ammonium, sodium or potassium persulfate, potassium perphosphate, sodium perborate, as well as redox systems. Redox systems consist as a rule of an organic oxidising agent and a reducing agent, wherein heavy metal ions may in addition be present in the reaction medium (see Houben-Weyl, Methoden der Organischen Chemie, Vol. 14/1, pp. 263 to 297).

The polymerisation temperature is in general 25° C. to 160° C., preferably 40° C. to 90° C. Suitable emulsifiers are mentioned above.

The graft polymerisation may be carried out under conventional temperature conditions, for example. isothermally; the graft polymerisation is however preferably carried out so that the temperature difference between the start and end of the reaction is at least 10° C., preferably at least 15° C., and particularly preferably at least 20° C.

In order to produce the components I) and II) according to the invention, the graft polymerisation may preferably be carried out by the addition of monomers in such a way that 55 to 90 wt. %, preferably 60 to 80 wt. % and particularly preferably 65 to 75 wt. % of the total amount of monomers used in the graft polymerisation are metered in during the first half of the overall time for metering in the monomers; the remaining proportion of the monomers is metered in within the second half of the overall time for metering in the monomers.

As rubber-free copolymers III) there are preferably used copolymers of styrene and acrylonitrile in a weight ratio of 95:5 to 50:50, wherein styrene and/or acrylonitrile may be wholly or partially replaced by α-methylstyrene, methyl methacrylate or N-phenylmaleimide.

Particularly preferred are copolymers III) containing proportions of incorporated acrylonitrile units of <30 wt. %.

These copolymers preferably have mean molecular weights $\overline{M}_w$ of 20,000 to 200,000 and intrinsic viscosities [η] of 20 to 110 ml/g (measured in dimethylformamide at 25° C.).

Details concerning the production of these resins are described for example in DE-A 2 420 358 and DE-A 2 724 360. Vinyl resins produced by bulk polymerisation or solution polymerisation have proved to be particularly suitable. The copolymers may be added alone or as an arbitrary mixture.

Apart from using thermoplastic resins built up from vinyl monomers, it is also possible to use polycondensates, for example aromatic polycarbonates, aromatic polyester carbonates, polyesters or polyamides as rubber-free copolymer in the moulding compositions according to the invention.

Suitable thermoplastic polycarbonates and polyester carbonates are known (see for example DE-A 1 495 626, DE-A 2 232 877, DE-A 2 703 376, DE-A 2 714 544, DE-A 3 000 610, DE-A 3 832 396, DE-A 3 077 934), which may be prepared for example by reacting diphenols of the formulae (IV) and (V)

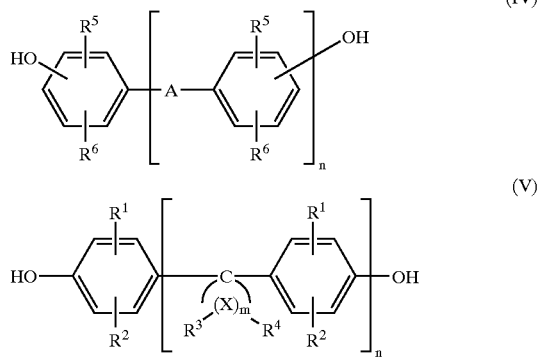

in which
A denotes a single bond $C_1$–$C_5$-alkylene, $C_2$–$C_5$-alkylidene, $C_5$–$C_6$-cycloalkylidene, —O—, —S—, —SO—, —SO$_2$— or —CO—, $R^5$ and $R^6$ independently of one another denote hydrogen, methyl or halogen, in particular hydrogen, methyl, chlorine or bromine, $R^1$ and $R^2$ independently of one another denote hydrogen, halogen, preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, in particular benzyl, m is an integer from 4 to 7, preferably 4 or 5, n is 0 or 1, $R^3$ and $R^4$ may be selected individually for each X and independently of one another denote hydrogen or $C_1$–$C_6$-alkyl, and X denotes carbon, with carbonic acid halides, preferably phosgene, and/or with aromatic dicarboxylic acid dihalides, preferably benzenedicarboxylic acid dihalides, by phase boundary polycondensation, or with phosgene by polycondensation in the homogeneous phase (so-called pyridine process), wherein the molecular weight may be adjusted in a known manner by adding an appropriate amount of known chain terminators.

Suitable diphenols of the formulae (IV) and (V) are for example hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4,-trimethylcyclopentane.

Preferred diphenols of the formula (IV) are 2,2-bis-(4-hyroxyphenyl)-propane and 1,1-bis-(4-hydroxyphenyl)-cyclohexane, and the preferred phenol of the formula (V) is 1,1-bis-(4-hydroxyphenyl)-3,3,5-trimethylcyclohexane.

Mixtures of diphenols may also be used.

Suitable chain terminators are for example phenol, p-tert.-butylphenol, long-chain alkylphenols such as 4-(1,3-tetramethylbutyl)phenol according to DE-A 2 842 005, monoalkylphenols, dialkylphenols having a total of 8 to 20 C atoms in the alkyl substituents according to DE-A 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The necessary amount of chain terminators is generally 0.5 to 10 mole % referred to the sum of the diphenols (IV) and (V).

The suitable polycarbonates or polyester carbonates may be linear or branched; preferred products are preferably obtained by incorporating 0.05 to 2.0 mole %, referred to the sum of the diphenols employed, of trifunctional or higher than trifunctional compounds, for example those having three or more than three phenolic OH groups.

The suitable polycarbonates or polyester carbonates may contain aromatically bound halogen, preferably bromine and/or chlorine; however, they are preferably halogen-free.

The polycarbonates and polyester carbonates have mean molecular weights ($\overline{M}_w$, weight average), determined for example by ultracentrifugation or light scattering measurements, of 10,000 to 200,000, preferably 20,000 to 80,000.

Suitable thermoplastic polyesters are preferably polyalkylene terephthalates, i.e. reaction products of aromatic dicarboxylic acids or their reactive derivatives (e.g. dimethyl esters or anhydrides) with aliphatic, cycloaliphatic or arylaliphatic diols and mixtures of such reaction products.

Preferred polyalkylene terephthalates can be prepared from terephthalic acids (or their reactive derivatives) and aliphatic or cycloaliphatic diols with 2 to 10 C atoms according to known methods (Kunststoff-Handbuch, Vol. VIII, p. 695 et seq. Carl Hanser Verlag, Munich 1973).

In preferred polyalkylene terephthalates 80 to 100 mole %, preferably 90 to 100 mole % of the dicarboxylic acid residues are terephthalic acid residues, and 80 to 100 mole %, preferably 90 to 100 mole % of the diol residues are ethylene glycol residues and/or butanediol-1,4 residues.

The preferred polyalkylene terephthalates may in addition to ethylene glycol residues or butanediol-1,4 residues also contain 0 to 20 mole % of residues of other aliphatic diols with 3 to 12 C atoms or cycloaliphatic diols with 6 to 12 C atoms, for example residues of propanediol-1,3, 2-ethylpropanediol-1,3, neopentyl glycol, pentanediol-1,5, hexanediol-1,6, cyclohexanedimethanol-1,4, 3-methylpentanediol-1,3 and -1,6, 2-ethylhexanediol-1,3, 2,2-diethylpropanediol-1,3, hexanediol-2,5, 1,4-di(β-hydroxyethoxy)-benzene, 2,2-bis-4-(hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates may be branched by incorporating relatively small amounts of trihydroxy or tetrahydroxy alcohols or 3-basic or 4-basic carboxylic acids, such as are described in DE-OS 1 900 270 and in U.S. Pat. No. 3,692,744. Examples of preferred branching agents are trimesic acid, trimellitic acid, trimethylol ethane and trimethylol propane, and pentaerythritol. It is advisable to use not more than 1 mole % of the branching agent, referred to the acid component.

Particularly preferred are polyalkylene terephthalates that have been produced solely from terephthalic acid and its reactive derivatives (for example its dialkyl esters) and ethylene glycol and/or butanediol-1,4, and mixtures of these polyalkylene terephthalates.

Preferred polyalkylene terephthalates are also copolyesters that have been prepared from at least two of the abovementioned alcohol components: particularly preferred copolyesters are poly(ethyleneglycol butanediol-1,4)-terephthalates.

The preferably suitable polyalkylene terephthalates generally have an intrinsic viscosity of 0.4 to 1.5 dl/g, preferably 0.5 to 1.3 dl/g, in particular 0.6 to 1.2 dl/g, measured in each case in phenol/o-dichlorobenzene (1:1 parts by weight) at 25° C.

Suitable polyamides are known homopolyamides, copolyamides and mixtures of these polyamides. These polyamides may be partially crystalline and/or amorphous.

Suitable partially crystalline polyamides are polyamide-6, polyamide-6,6, mixtures and corresponding copolymers of these components. Also suitable are partially crystalline polyamides whose acid component consists wholly or partially of terephthalic acid and/or isophthalic acid and/or cork acid and/or sebacic acid and/or azelaic acid and/or adipic acid and/or cyclohexanedicarboxylic acid, whose diamine component consists wholly or partially of m- and/or p-xylylenediamine and/or hexamethylenediamine and/or 2,2,4-trimethylhexamethylenediamine and/or 2,2,4-trimethylhexamethylenediamine and/or isophorone diamine, and whose composition is in principle known.

There may also be mentioned polyamides that have been produced wholly or partially from lactams with 7 to 12 C atoms in the ring, optionally with the co-use of one or more of the abovementioned starting components.

Particularly preferred partially crystalline polyamides are polyamide-6 and polyamide-6,6 and their mixtures. As amorphous polyamides there may be used known products that are obtained by polycondensation of diamines such as ethylene diamine, hexamethylenediamine, decamethylenediamine, 2,2,4- and/or 2,4,4-trimethylhexamethylenediamine, m- and/or p-xylylenediamine, bis-(4-aminocyclohexyl)-methane, bis-(4-aminocyclohexyl)-propane, 3,3'-dimethyl-4,4'-diaminodicyclohexylmethane, 3-aminomethyl-3,5,5,-trimethylcyclohexylamine, 2,5- and/or 2,6-bis-(aminomethyl)-norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of several monomers, as well as copolymers prepared with the addition of aminocarboxylic acids such as ε-aminocaproic acid, ω-aminolauric acid or ω-aminolauric acid or their lactams.

Particularly suitable amorphous polyamides are the polyamides prepared from isophthalic acid, hexamethylenediamine and further diamines such as 4,4'-diaminodicyclohexylmethane, isophorone diamine, 2,2,4- and/or 2,4,4-trimethylhexamethylenediamine, 2,5- and/or 2,6-bis-(aminomethyl)-norbornene; or from isophthalic acid, 4,4'-diaminodicyclohexylmethane and ε-caprolactam; or from isophthalic acid, 3,3'-dimethyl-4,4'-diaminodicyclohexylmethane and laurinlactam; or from terephthalic acid and the isomeric mixture of 2,2,4- and/or 2,4,4-trimethylhexamethylenediamine.

Instead of the pure 4,4'-diaminodicyclohexylmethane, mixtures of the positional isomeric diaminodicyclohexylmethanes that are composed of the following components may also be used 70 to 99 mole % of the 4,4'-diamino isomer 1 to 30 mole % of the 2,4'-diamino isomer 0 to 2 mole % of the 2,2'-diamino isomer, and optionally correspondingly higher condensed diamines that are obtained by hydrogenating industrial quality diaminodiphenylmethane. The isophthalic acid may be replaced in an amount of up to 30% by terephthalic acid.

The polyamides preferably have a relative viscosity (measured in a 1 wt. % solution in m-cresol at 25° C.) of 2.0 to 5.0, particularly preferably 2.5 to 4.0.

The moulding compositions according to the invention are produced by mixing the components I), II) and III) and optionally further polymers and conventional additives in conventional mixing units (preferably in multiple roll mills, mixing extruders or internal kneaders).

The present invention furthermore provides a process for producing the moulding compositions according to the invention, in which the components I), II) and III) and optionally further polymers and conventional additives are mixed and are then compounded and extruded at elevated temperature, in general at temperatures from 150° C. to 300° C.

Necessary and/or advantageous additives, for example antioxidants, UV stabilisers, peroxide destroyers, antistatic agents, lubricating agents, mould release agents, flame protection agents, fillers or reinforcing materials (glass fibres, carbon fibres etc.) and pigments may be added to the moulding compositions according to the invention during the production, processing, further processing and final shaping stages.

The final shaping may be carried out in conventional commercial processing units, and includes for example processing by injection moulding, plate extrusion optionally followed by heat forming, cold forming, extrusion of pipes and profiled sections, and calender processing.

In the following examples the specified parts are always parts by weight and the specified % are always wt. % unless otherwise stated.

EXAMPLES

Components

ABS Graft Polymer 1 (According to the Invention)

50 parts by weight (calculated as solids) of an anionically emulsified polybutadiene latex with a mean particle diameter $d_{50}$ of 137 nm and a gel content of 88 wt. %, produced by free-radical seed polymerisation using a polybutadiene seed latex with a mean particle diameter $d_{50}$ of 48 nm are adjusted with water to a solids content of ca. 20 wt. %, following which the batch is heated to 59° C. and 0.5 part by weight of potassium peroxodisulfate (dissolved in water) is added.

50 parts by weight of a mixture of 73 wt. % of styrene, 27 wt. % of acrylonitrile and 0.15 part by weight of tert.-dodecyl mercaptan are next uniformly metered in within 6 hours, and in parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the 6 hours the reaction temperature is raised from 59° C. to 80° C. After a post-reaction time of 2 hours at 80° C., the graft latex is coagulated by adding ca. 1.0 part by weight of a phenolic antioxidant together with a magnesium sulfate/acetic acid mixture, and after washing with water the resultant moist powder is dried at 70° C.

ABS Graft Polymer 2 (According to the Invention)

60 parts by weight (calculated as solids) of an anionically emulsified polybutadiene latex produced by free-radical seed polymerisation using the polybutadiene seed latex from Example 1 with a mean particle diameter $d_{50}$ of 137 nm and a gel content of 88 wt. % as seed latex, and having a mean particle diameter $d_{50}$ of 456 nm and a gel content of 76 wt. %, are adjusted with water to a solids content of ca. 20 wt.

%, following which the batch is heated to 59° C. and 0.5 part by weight of potassium peroxodisulfate (dissolved in water) is added.

40 parts by weight of a mixture of 73 wt. % of styrene, 27 wt. % of acrylonitrile and 0.12 part by weight of tert.-dodecyl mercaptan are then uniformly metered in within 6 hours, and in parallel to this 1 part by weight (calculated as solids) of the sodium salt of a resin acid mixture (Dresinate 731, Abieta Chemie GmbH, Gersthofen, Germany, dissolved in alkaline adjusted water) is metered in over a period of 6 hours. During the course of the 6 hours the reaction temperature is raised from 59° C. to 80° C. After a post-reaction time of 2 hours at 80° C., the graft latex is coagulated by adding ca. 1.0 part by weight of a phenolic antioxidant together with a magnesium sulfate/acetic acid mixture, and after washing with water the resultant moist powder is dried at 70° C.

ABS Graft Polymer 3 (According to the Invention)

The "ABS graft polymer 2" instructions are repeated, except that a polybutadiene latex produced using the latex from Example 1 as seed latex and having a mean particle diameter $d_{50}$ of 445 nm and a gel content of 84 wt. % is used as grafting base.

ABS Graft Polymer 4 (According to the Invention)

The "ABS graft polymer 2" instructions are repeated, except that a polybutadiene latex produced using the latex from Example 1 as seed latex and having a mean particle diameter $d_{50}$ of 427 nm and a gel content of 65 wt. % is used as grafting base.

ABS Graft Polymer 5 (Comparison)

The "ABS graft polymer 1" instructions are repeated, except that a polybutadiene latex produced without using a polybutadiene seed latex and having a mean particle diameter $d_{50}$ of 140 nm and a gel content of 90 wt. % is employed as grafting base.

ABS Graft Polymer 6 (Comparison)

The "ABS graft polymer 2" instructions are repeated, except that a polybutadiene latex produced without using a polybutadiene seed latex and having a mean particle diameter $d_{50}$ of 447 nm and a gel content of 72 wt. % is employed as grafting base.

ABS Graft Polymer 7 (Comparison)

The "ABS graft polymer 2" instructions are repeated, except that a polybutadiene latex produced without using a polybutadiene seed latex and having a mean particle diameter $d_{50}$ of 435 nm and a gel content of 80 wt. % is used as grafting base.

ABS Graft Polymer 8 (Comparison)

The "ABS graft polymer 2" instructions are repeated, except that a polybutadiene latex produced without using a polybutadiene seed latex and having a mean particle diameter $d_{50}$ of 429 nm and a gel content of 69 wt. % is used as grafting base.

ABS Graft Polymer 9 (According to the Invention)

The "ABS graft polymer 1" instructions are repeated, wherein a polybutadiene latex with a mean particle diameter $d_{50}$ of 40 nm and a polybutadiene latex based thereon and having a mean particle diameter $d_{50}$ of 111 nm and a gel content of 91 wt. % is employed.

ABS Graft Polymer 10 (According to the Invention)

The "ABS graft polymer 2" instructions are repeated, wherein the polybutadiene latex from Example 9 having a mean particle diameter $d_{50}$ of 111 nm and a gel content of 91 wt. % is employed as seed latex. The resulting polybutadiene latex used for the production of the graft polymer has a mean particle diameter $d_{50}$ of 391 nm and a gel content of 80 wt. %.

ABS Graft Polymer 11 (According to the Invention)

The "ABS graft polymer 10" instructions are repeated, wherein a polybutadiene latex produced using the polybutadiene latex from Example 9 as seed latex ($d_{50}$=111 nm) and having a mean particle diameter $d_{50}$ of 402 nm and a gel content of 85 wt. % is employed as grafting base.

ABS Graft Polymer 12 (According to the Invention)

The "ABS graft polymer 10" instructions are repeated, wherein a polybutadiene latex produced using the polybutadiene latex from Example 9 as seed latex ($d_{50}$=111 nm) and having a mean particle diameter $d_{50}$ of 416 nm and a gel content of 87 wt. % is employed as grafting base.

Resin Component

A statistical styrene/acrylonitrile copolymer (styrene:acrylonitrile weight ratio 72:28) having a $\overline{M}_w$ of ca. 85,000 and $\overline{M}_w/\overline{M}_n-1<2$ obtained by free radical solution polymerisation.

Moulding Compositions

The aforedescribed polymer components are mixed in an internal kneader in the proportions given in Table 1 together with 2 parts by weight of ethylenediamine bisstearyl amide and 0.1 part by weight of a silicone oil and after granulation are worked up to test pieces and to a flat sheet (in order to evaluate the surface).

The following data are obtained: notched impact strength at room temperature ($a_k^{RT}$) and at −40° C. ($a_k^{-40°\ C.}$) according to ISO 180/1A (unit: kJ/m²), ball indentation hardness (Hc) according to DIN 53 456 (unit: N/mm²), thermoplastic flow (MVI) according to DIN 53 735 U (unit: cm³/10 min) and surface gloss according to DIN 67 530 at a reflection angle of 20° (reflectometer value).

It is clear from the Examples (test data see Table 2) that the products according to the invention exhibit very narrow fluctuation widths in the most important properties (in particular toughness and processability).

Although the comparison products exhibit similar absolute values for the tested properties, the fluctuation widths are however much greater.

TABLE 1

Compositions of the moulding compositions

| Example | ABS graft polymer | | | | | | | | | | | | Resin Component (parts by wt.) |
|---|---|---|---|---|---|---|---|---|---|---|---|---|---|
| | 1 (parts by wt.) | 2 (parts by wt.) | 3 (parts by wt.) | 4 (parts by wt.) | 5 (parts by wt.) | 6 (parts by wt.) | 7 (parts by wt.) | 8 (parts by wt.) | 9 (parts by wt.) | 10 (parts by wt.) | 11 (parts by wt.) | 12 (parts by wt.) | |
| 1 | 15 | 15 | — | — | — | — | — | — | — | — | — | — | 70 |
| 2 | 15 | — | 15 | — | — | — | — | — | — | — | — | — | 70 |
| 3 | 15 | — | — | 15 | — | — | — | — | — | — | — | — | 70 |
| 4 (Comparison) | — | — | — | — | 15 | 15 | — | — | — | — | — | — | 70 |
| 5 | — | — | — | — | 15 | — | 15 | — | — | — | — | — | 70 |

TABLE 1-continued

Compositions of the moulding compositions

| Example | ABS graft polymer | | | | | | | | | | | | Resin Component (parts by by wt.) |
|---|---|---|---|---|---|---|---|---|---|---|---|---|---|
| | 1 (parts by wt.) | 2 (parts by wt.) | 3 (parts by wt.) | 4 (parts by wt.) | 5 (parts by wt.) | 6 (parts by wt.) | 7 (parts by wt.) | 8 (parts by wt.) | 9 (parts by wt.) | 10 (parts by wt.) | 11 (parts by wt.) | 12 (parts by wt.) | |
| (Comparison) 6 | — | — | — | — | 15 | — | — | 15 | — | — | — | — | 70 |
| (Comparison) 7 | — | — | — | — | — | — | — | — | 15 | 15 | — | — | 70 |
| 8 | — | — | — | — | — | — | — | — | 15 | — | 15 | — | 70 |
| 9 | — | — | — | — | — | — | — | — | 15 | — | — | 15 | 70 |

TABLE 2

Test data of the moulding compositions

| Example | $a_k^{RT}$ (kJ/m$^2$) | $a_k^{-40° C.}$ (kJ/m$^2$) | Hc (N/mm$^2$) | MVI (cm$^3$/10 min) | Degree of gloss |
|---|---|---|---|---|---|
| 1 | 18.5 | 8.0 | 102 | 31.5 | 93 |
| 2 | 18.5 | 8.4 | 103 | 33.1 | 95 |
| 3 | 17.9 | 8.1 | 102 | 32.5 | 93 |
| 4 (Comparison) | 19.9 | 9.1 | 103 | 36.6 | 91 |
| 5 (Comparison) | 18.6 | 8.0 | 104 | 34.2 | 90 |
| 6 (Comparison) | 17.1 | 7.4 | 105 | 33.0 | 94 |
| 7 | 17.8 | 7.3 | 110 | 33.5 | 94 |
| 8 | 17.3 | 7.8 | 110 | 34.0 | 95 |
| 9 | 17.6 | 7.5 | 111 | 34.0 | 94 |

What is claimed is:

1. Polymer compositions containing

I) at least one graft rubber polymer obtained by emulsion polymerisation of styrene and acrylonitrile in a weight ratio of 95:5 to 50:50, styrene and/or acrylonitrile being able to be partially or completely replaced by α-methylstyrene, methyl methacrylate or N-phenylmalideimide or mixtures thereof, in the presence of a butadiene polymer latex (A) with a mean particle diameter $d_{50}$ of 80 to 220 nm, II) at least one graft rubber polymer obtained by emulsion polymerisation of styrene and acrylonitrile in a weight ratio of 95:5 to 50:50, styrene and/or acrylonitrile being able to be completely or partially replaced by α-methylstyrene, methyl methacrylate or N-phenylmaleimide or mixtures thereof, in the presence of a butadiene polymer latex (B) with a mean particle diameter $d_{50}$ of 340 to 480 nm, III) at least one rubber-free copolymer of styrene and acrylonitrile in a weight ratio of 95:5 to 50:50, styrene and/or acrylonitrile being able to be completely or partially replaced by α-methylstyrene, methyl methacrylate or N-phenylmaleimide or mixtures thereof, characterised in that the butadiene polymer latex (A) is obtained by seed polymerisation using a seed latex with a mean particle diameter of 10 to 100 nm, and the butadiene polymer latex (B) is obtained by seed polymerisation using the butadiene polymer latex (A) as seed latex.

2. Polymer compositions according to claim 1, containing

I) at least one graft rubber polymer obtained by emulsion polymerisation of styrene and acrylonitrile in a weight ratio of 95:5 to 50:50, styrene and/or acrylonitrile being able to be partially or completely replaced by α-methylstyrene, methyl methacrylate or N-phenylmaleimide or mixtures thereof, in the presence of a butadiene polymer latex (A) with a mean particle diameter $d_{50}$ of 90 to 210 nm, II) at least one graft rubber polymer obtained by emulsion polymerisation of styrene and acrylonitrile in a weight ratio of 95:5 to 50:50, styrene and/or acrylonitrile being able to be completely or partially replaced by α-methylstyrene, methyl methacrylate or N-phenylmaleimide or mixtures thereof, in the presence of a butadiene polymer latex (B) with a mean particle diameter $d_{50}$ of 350 to 470 nm, III) at least one rubber-free copolymer of styrene and acrylonitrile in a weight ratio of 95:5 to 50:50, styrene and/or acrylonitrile being able to be completely or partially replaced by α-methylstyrene, methyl methacrylate or N-phenylmaleimide or mixtures thereof, characterised in that the butadiene polymer latex (A) is obtained by seed polymerisation using a seed latex with a mean particle diameter of 20 to 90 nm, and the butadiene polymer latex (B) is obtained by seed polymerisation using the butadiene polymer latex (A) as seed latex.

3. Polymer compositions according to claim 1 containing in addition at least one resin selected from the group consisting of an aromatic polycarbonate, aromatic polyester carbonate, polyester and polyamide.

4. Polymer compositions according to claim 1 characterised in that in the production of the graft rubber polymers the monomer feed is carried out in such a way that 55 to 90 wt. % of all the monomers to be used in the graft polymerisation are metered in during the first half of the overall time for metering in the monomers and the remaining proportion of the monomers is metered in during the second half of the overall time for metering in the monomers.

5. Polymer compositions according to claim 1 characterised in that in the production of the graft rubber polymers the temperature difference between the start and end of the grafting reaction is at least 15° C.

6. Process for producing polymer compositions according to claim 1 wherein the butadiene polymer latex (A) is obtained by seed polymerisation using a seed latex with a mean particle diameter of 10 to 100 nm and the butadiene polymer latex (B) is obtained by seed polymerisation using the butadiene polymer latex (A) as seed latex.

7. Process for producing polymer compositions according to claim 1 characterised in that the components I), II) and III) are mixed and are then compounded and extruded at elevated temperature.

8. A molded article comprising the composition of claim 1.

* * * * *